US010189086B2

(12) United States Patent
Hellestam et al.

(10) Patent No.: US 10,189,086 B2
(45) Date of Patent: Jan. 29, 2019

(54) METHOD AND APPARATUS FOR MANUFACTURING POROUS THREE-DIMENSIONAL ARTICLES

(71) Applicant: ARCAM AB, Moelndal (SE)

(72) Inventors: Calle Hellestam, Goeteborg (SE); Jenny Olsson, Torslanda (SE); Isak Elfstroem, Kungsbacka (SE)

(73) Assignee: ARCAM AB, Moelndal (SE)

( * ) Notice: Subject to any disclaimer, the term of this patent is extended or adjusted under 35 U.S.C. 154(b) by 0 days.

(21) Appl. No.: 14/350,767

(22) PCT Filed: Dec. 18, 2012

(86) PCT No.: PCT/EP2012/076025
§ 371 (c)(1),
(2) Date: Apr. 9, 2014

(87) PCT Pub. No.: WO2013/098135
PCT Pub. Date: Jul. 4, 2013

(65) Prior Publication Data
US 2014/0301884 A1 Oct. 9, 2014

Related U.S. Application Data

(60) Provisional application No. 61/580,775, filed on Dec. 28, 2011.

(51) Int. Cl.
B22F 3/105 (2006.01)
B22F 3/00 (2006.01)
B33Y 30/00 (2015.01)
B33Y 10/00 (2015.01)
B22F 3/11 (2006.01)
B29C 64/153 (2017.01)
B29K 105/04 (2006.01)

(52) U.S. Cl.
CPC ............ *B22F 3/008* (2013.01); *B22F 3/1055* (2013.01); *B22F 3/11* (2013.01); *B29C 64/153* (2017.08); *B33Y 10/00* (2014.12); *B33Y 30/00* (2014.12); *B29K 2105/04* (2013.01); *Y02P 10/295* (2015.11)

(58) Field of Classification Search
CPC .......... B22F 3/1055; B22F 3/008; B22F 3/11
USPC .......................................................... 419/2
See application file for complete search history.

(56) References Cited

U.S. PATENT DOCUMENTS

| 2,264,968 | A | 12/1941 | De Forest |
|---|---|---|---|
| 2,323,715 | A | 7/1943 | Kuehni |
| 3,634,644 | A | 1/1972 | Ogden et al. |
| 3,838,496 | A | 10/1974 | Kelly |
| 3,882,477 | A | 5/1975 | Mueller |
| 3,906,229 | A | 9/1975 | Demeester et al. |
| 3,908,124 | A | 9/1975 | Rose |
| 4,314,134 | A | 2/1982 | Schumacher et al. |
| 4,348,576 | A | 9/1982 | Anderl et al. |
| 4,352,565 | A | 10/1982 | Rowe et al. |
| 4,401,719 | A | 8/1983 | Kobayashi et al. |
| 4,541,055 | A | 9/1985 | Wolfe et al. |
| 4,818,562 | A | 4/1989 | Arcella et al. |
| 4,863,538 | A | 9/1989 | Deckard |
| 4,888,490 | A | 12/1989 | Bass et al. |
| 4,927,992 | A | 5/1990 | Whitlow et al. |
| 4,958,431 | A | 9/1990 | Clark et al. |
| 4,988,844 | A | 1/1991 | Dietrich et al. |
| 5,118,192 | A | 6/1992 | Chen et al. |
| 5,135,695 | A | 8/1992 | Marcus |
| 5,167,989 | A | 12/1992 | Dudek et al. |
| 5,182,170 | A | 1/1993 | Marcus et al. |
| 5,204,055 | A | 4/1993 | Sachs et al. |
| 5,247,560 | A | 9/1993 | Hosokawa et al. |

(Continued)

FOREIGN PATENT DOCUMENTS

| CA | 2860188 A1 | 6/2006 |
|---|---|---|
| CN | 101607311 A | 12/2009 |

(Continued)

OTHER PUBLICATIONS

European Search Report dated Feb. 16, 2012, for corresponding Application No. EP07852089.7.
International Preliminary Examining Authority, International Preliminary Report on Patentability for International Application No. PCT/EP2012/074383, including Applicant's Sep. 6, 2013 Reply to ISA's Feb. 27, 2013 Written Opinion, dated Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.

(Continued)

Primary Examiner — Christopher S Kessler
(74) Attorney, Agent, or Firm — Alston & Bird LLP

(57) ABSTRACT

Disclosed is a method for manufacturing three-dimensional articles with porosity. A model is created of a porous structure, said creating step comprising the steps of: defining a three-dimensional space comprising a predetermined pattern of nodes, wherein said nodes are connected together in a predetermined manner with struts, moving each node in said three-dimensional space a randomized distance, which distance is less than a predetermined value and in a randomized direction, slicing said three-dimensional space into a predetermined number of two-dimensional layers with a predetermined thickness, slicing said three-dimensional article into two-dimensional layers with a predetermined thickness, applying one two-dimensional layer of said article on one two-dimensional layer of said porous structure resulting in a porous two-dimensional layer of said article, repeating said applying step for all two dimensional layers of said article, manufacturing the three-dimensional article with porosity according to the model by exposing fusible material to an energy source.

7 Claims, 4 Drawing Sheets

(56) References Cited

U.S. PATENT DOCUMENTS

| | | |
|---|---|---|
| 5,393,482 A | 2/1995 | Benda et al. |
| 5,483,036 A | 1/1996 | Giedt et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1* | 7/2006 | Jones et al. ............ 419/8 |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |

(56) References Cited

U.S. PATENT DOCUMENTS

| | | |
|---|---|---|
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | WO 93/08928 A1 | 5/1993 |
| WO | WO 1996/012607 A1 | 5/1996 |
| WO | WO 1997/037523 A2 | 10/1997 |
| WO | WO 01/85386 A2 | 11/2001 |
| WO | WO 2001/081031 A1 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

International Search Report dated Sep. 17, 2008 for Application No. PCT/SE2008/000007.
International Search Report dated Sep. 2, 2008 of corresponding international application No. PCT/SE2007/001084.
International Searching Authority, International Search Report and Written Opinion for International Application No. PCT/EP2012/074383, dated Feb. 27, 2013, 10 pages, European Patent Office, The Netherlands.
International Searching Authority, International Search Report for International Application No. PCT/SE2011/050093, dated Oct. 20, 2011, 5 pages, The Swedish Patent and Registration Office, Sweden.
Office Action dated Feb. 14, 2012 for U.S. Appl. No. 12/745,081.
Office Action dated Nov. 8, 2011, U.S. Appl. No. 12/745,081.
United States Patent and Trademark Office, Final Office Action for U.S. Appl. No. 12/745,081, dated Jun. 21, 2012, 6 pages, USA.
United States Patent and Trademark Office, Notice of Allowance and Fee(s) Due for U.S. Appl. No. 13/144,451, dated Sep. 25, 2012, 16 pages, USA.
United States Patent and Trademark Office, Office Action for U.S. Appl. No. 12/810,602, dated Sep. 10, 2012, 13 pages, USA.
United States Patent and Trademark Office, Office Action for U.S. Appl. No. 12/810,602, dated Dec. 20, 2012, 8 pages, USA.
International Searching Authority (ISA), International Search Report and Written Opinion for International Application No. PCT/EP2012/076025, dated May 17, 2013, 11 pages, European Patent Office, The Netherlands.

(56) References Cited

OTHER PUBLICATIONS

International Preliminary Examining Authority (IPEA), Second Written Opinion for International Application No. PCT/EP2012/076025, dated Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Weigel, TH., et al., "Design and Preparation of Polymeric Scaffolds for Tissue Engineering," Expert Rev. Med. Devices, 2006, pp. 835-851, vol. 3, No. 6, XP002691485.

Guibas, Leonidas J., et al., "Randomized Incremental Construction of Delaunay and Voronoi Diagrams", *Algorithmica*, Jun. 1992, pp. 381-413, vol. 7, Issue 1-6, Springer-Verlag, New York.

United States Patent and Trademark Office, Office Action for U.S. Appl. No. 12/810,602, dated Sep. 11, 2014, 7 pages, USA.

International Searching Authority, International Search Report for International Application No. PCT/EP2012/058733, dated Mar. 5, 2013, 4 pages, European Patent Office, The Netherlands.

Gibson, D.W., et al., "Additive Manufacturing Technologies: Rapid Prototyping to Direct Digital Manufacturing", 2010, pp. 126-129, Springer, New York.

Motojima, Seiji, et al., "Chemical Vapor Growth of $LaB_6$ Whiskers and Crystals Having a Sharp Tip", Journal of Crystal Growth, vol. 44, No. 1, Aug. 1, 1978 (Aug. 1, 1978), pp. 106-109.

Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.

\* cited by examiner

METHOD AND APPARATUS FOR MANUFACTURING POROUS THREE-DIMENSIONAL ARTICLES

CROSS REFERENCE TO RELATED APPLICATIONS

This application is a national stage application, filed under 35 U.S.C. § 371, of International Application No. PCT/EP2012/076025, filed Dec. 18, 2012, which claims priority to U.S. Provisional Application No. 61/580,775, filed Dec. 28, 2011, the contents of both which are hereby incorporated by reference in their entirety.

BACKGROUND

Related Field

The present invention relates to a method and an apparatus for manufacturing a three-dimensional article with porosity.

Description of Related Art

Additive manufacturing is a method for forming three-dimensional articles through successive fusion of chosen parts of powder layers applied to a worktable.

Such an apparatus may comprise a work table on which said three-dimensional article is to be formed, a powder dispenser, arranged to lay down a thin layer of powder on the work table for the formation of a powder bed, an energy beam source for delivering energy to the powder whereby fusion of the powder takes place, elements for control of the energy given off by the energy beam source over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

Three-dimensional network structures may be used in body implant articles such as bone replacements. In recent years artificial bone implants may have a solid core with a surface layer having a network structure. Said network structure improves the bone/tissue in-growth capability and thereby strengthens the connection between the human bone and the artificial bone implant. The material used in said network structures may for instance be Titanium, which is a well proven material to be compatible with the human body tissue. Titanium is a relatively light and strong material. An implant may efficiently aggregate to the human body if the network structure is as human like as possible.

One way of enhancing the effectiveness of an orthopedic implant may be to randomize the porous structure of an implant so it better simulates trabecular structures in which it is implanted. One way of doing so is disclosed in WO 2011/060312 relating to a controlled randomized porous structures and methods for making the same. In said document it is disclosed a method for randomizing the network structure in order to meet the above mentioned needs. WO 2011/060312 discloses a method for seamlessly joining randomized units with improved porosity without sacrificing the strength of the final implant article.

One problem with said solution is that the manufacturing process is relatively CPU and memory consuming. Another problem with said solution is that there is some degree of periodicity in the porosity of the final article which may cause mechanical strength limitations.

BRIEF SUMMARY

An object of the invention is to provide a method for an additive manufacturing process for manufacturing three dimensional articles with improved randomized porosity while minimizing the CPU and memory usage.

The above mentioned object is achieved by the features in the method according to claim 1.

In a first aspect of the invention it is provided a method for manufacturing a porous three-dimensional article. Said method comprising the steps of creating a model of a non-porous three-dimensional article comprising a predetermined number of two-dimensional layers with a predetermined thickness, creating a model of a porous structure comprising the steps of:
  defining a three-dimensional space comprising a randomized pattern of nodes, wherein said nodes are connected together in a predetermined manner with struts,
  slicing said three-dimensional space into a predetermined number of two-dimensional layers with a predetermined thickness,
  applying one two-dimensional layer of said model of non-porous three-dimensional article on one two-dimensional layer of said porous structure resulting in a porous two-dimensional layer of said article,
  repeating said applying step for all non-porous two-dimensional layers of said article,
manufacturing the porous three-dimensional article by exposing fusible material to an energy source, so that a layer of fused material is corresponding to a porous two-dimensional layer of said article.

An advantage of the present invention is that a final porous three-dimensional article can be manufactured which has a porous structure which is randomized in every direction, i.e., the porosity lacks periodicity meaning that the mechanical strength of the porosity is equal in all directions.

In another example embodiment said randomized pattern is defined by moving a predetermined number of nodes in a regular pattern of tetrahedrons, cubes or dodecahedrons a randomized distance, which distance is less than a predetermined value and in a randomized direction.

In an example embodiment said predetermined number of nodes is all nodes.

In still another example embodiment said randomized pattern is defined by the steps of:
  a. providing a predetermined number of nodes randomly in a 3-dimensional space of predetermined size,
  b. determining a maximum number of neighbor nodes to a specific node,
  c. skipping a number x of closest neighbors to said specific node where x is a random integer number being ≥0,
  d. connecting each of said maximum neighbor nodes to said specific node with a strut,
repeating step a-d for each node in the 3-D space.

In yet another example embodiment said randomized pattern is defined by the steps of:
  a. providing randomly a predetermined number of nodes in said three-dimensional space,
  b. providing said nodes in a Delauney-triangulation giving a predetermined number of Delauney-tetrahedrons,
  c. providing a Voronoi diagram for each Delauny-tetrahedron connecting a centre of a circumsphere of the Delauny-tetrahedron with the centers of circumspheres for all neighbors of the Delauny-tetrahedron.

An advantage with these embodiments is that the randomized patterns are relatively quickly to produce with a relatively small amount of computer power.

In another example embodiment of the present invention said manufacturing step comprising the steps of:
a. providing a layer of powder material on a build platform,
b. adapting the thickness of the powder material layer to the thickness of the predetermined thickness of the two-dimensional layer of said article.

An advantage with this embodiment is that the model and manufacturing process are connected to each other resulting in a more precisely manufactured three-dimensional articles. In an example embodiment there may not be an exact correspondence between the thickness of the model layer and the thickness of the powder layer. There might be a scaling factor between the model layer and powder layer depending inter alia on the dimension of the powder particles and/or the type of powder used.

In another aspect of the present invention it is provided an apparatus for manufacturing a three-dimensional article with porosity comprising:
means for creating a model of a non-porous three-dimensional article comprising a predetermined number of two-dimensional layers with a predetermined thickness,
means for creating a model of a porous structure comprising the steps of:
defining a three-dimensional space comprising a randomized pattern of nodes, wherein said nodes are connected together in a predetermined manner with struts,
slicing said three-dimensional space into a predetermined number of two-dimensional layers with a predetermined thickness,
applying one two-dimensional layer of said model of non-porous three-dimensional article on one two-dimensional layer of said porous structure resulting in a porous two-dimensional layer of said article,
repeating said applying step for all non-porous two-dimensional layers of said article,
means for manufacturing the porous three-dimensional article by exposing fusible material to an energy source, so that a layer of fused material is corresponding to a porous two-dimensional layer of said article.

An advantage of the present inventive apparatus is that a final porous three-dimensional article can be manufactured which has a porous structure which is randomized in every direction, i.e., the porosity lacks periodicity meaning that the mechanical strength of the porosity is equal in all directions.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
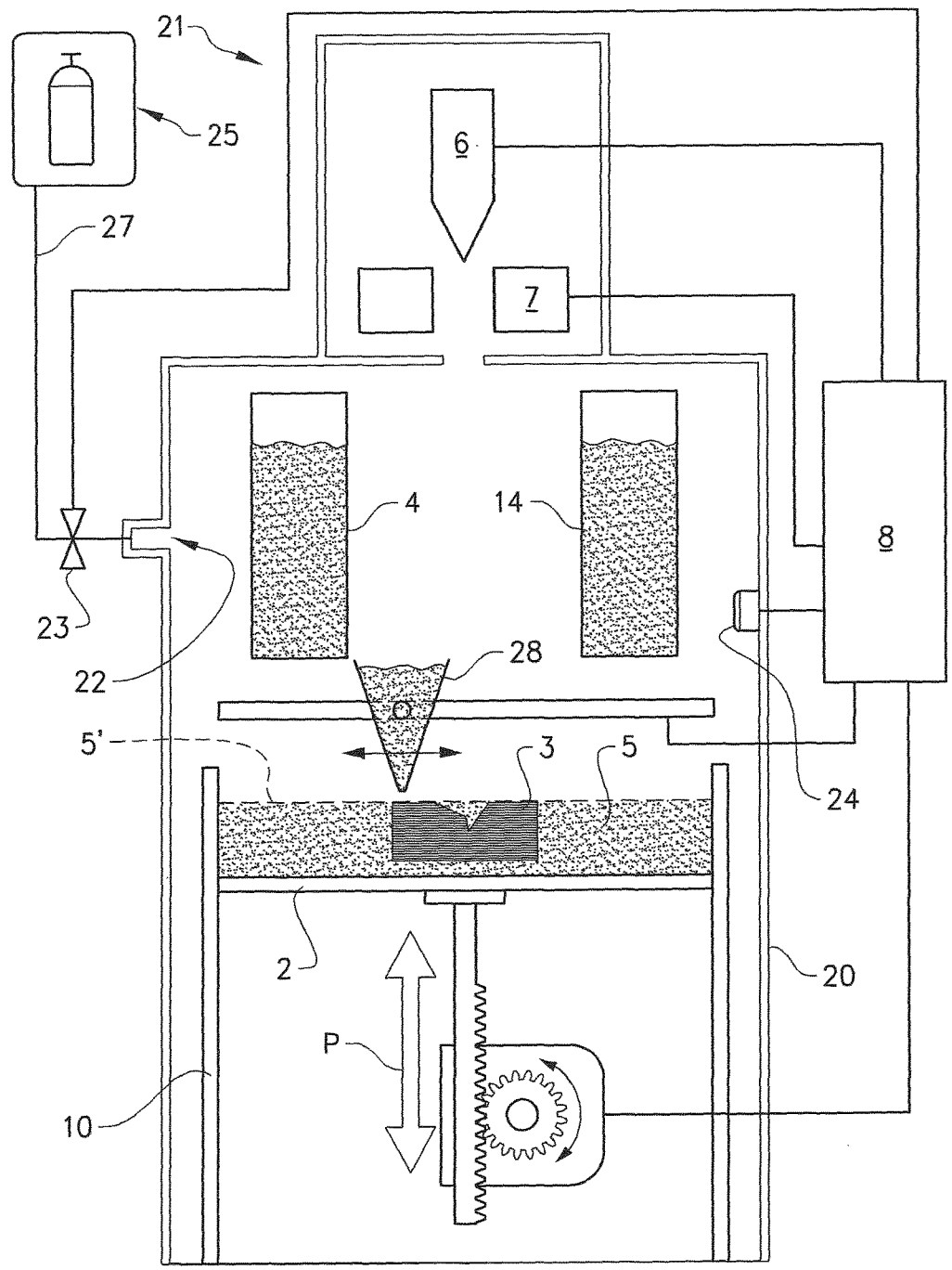
FIG. 1 shows, in a schematic view, an example embodiment of a device for producing a three dimensional product, in which device the inventive method can be applied.

FIG. 1 depicts an embodiment of a freeform fabrication or additive manufacturing apparatus 21 in which the inventive method according to the present invention may be implemented.

Said apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7 and an electron beam power supply (not shown) may be electrically connected to said control unit 8. In an example embodiment of the invention said electron beam gun 6 generates a focusable electron beam with an accelerating voltage of about 15-60 kV and with a beam power in the range of 3-10 Kw. The pressure in the vacuum chamber may be $10^{-3}$ mBar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr—W alloy, etc.

The powder distributor 28 is arranged to lay down a thin layer of the powder material on the build platform 2. During a work cycle the build platform 2 will be lowered successively in relation to the ray gun after each added layer of powder material. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An energy beam may be directed over said build platform 2 causing said first powder layer to fuse in selected locations to form a first cross section of said three-dimensional article. The energy beam may be an electron beam or a particle beam. The beam is directed over said build platform 2 from instructions given by the control unit 8. In the control unit 8 instructions for how to control the beam gun for each layer of the three-dimensional article is stored.

After a first layer is finished, i.e., the fusion of powder material for making a first layer of the three-dimensional article, a second powder layer is provided on said build platform 2. The second powder layer is preferably distributed according to the same manner as the previous layer. However, there might be alternative methods in the same additive manufacturing machine for distributing powder onto the work table. For instance, a first layer may be provided by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform 2, the energy beam is directed over said work table causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

In the case where an electron beam is used, it is necessary to consider the charge distribution that is created in the powder as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with predetermined values of the beam current and beam scanning velocity.

In a first embodiment of a method for manufacturing a porous three-dimensional article, a model is created of a non-porous three-dimensional article comprising a predetermined number of two-dimensional layers with a predetermined thickness. This non-porous model may for instance be made in a computer aided design (CAD) tool. The two-dimensional layers in said three-dimensional article may be made by slicing said three-dimensional article by a slicing tool, for instance Magics or Infinity Slicer. The non-porous three dimensional article has an outer boundary which is the same as an outer boundary of the porous final three-dimensional article, i.e., the only difference between the porous article to be manufactured and the non-porous three dimensional article lies in the porosity. It is relatively easy to make a three-dimensional design of an article which is solid in a CAD program. However, it is more difficult to make the same three-dimensional article with a randomized porosity in the same CAD program.

In a next step a model is created of a porous structure. Said modelling comprising a first step of defining a three-dimensional space comprising a randomized pattern of nodes, wherein said nodes are connected together in a predetermined manner with struts.

Figures 2A, 2B, 2C:
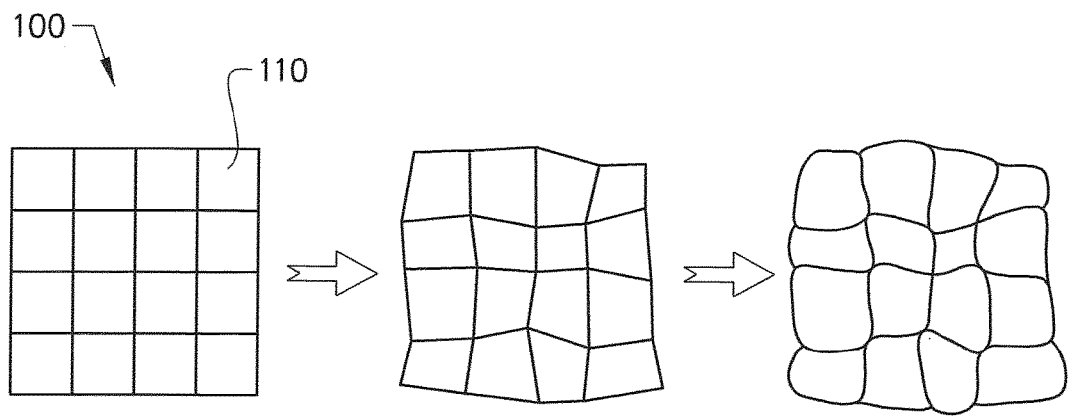
FIG. 2a depicts a regular 2-dimensional network.
FIG. 2b depicts a randomized 2-dimensional network.
FIG. 2c depicts a modified randomized 2-dimensional network.
Figure 3:
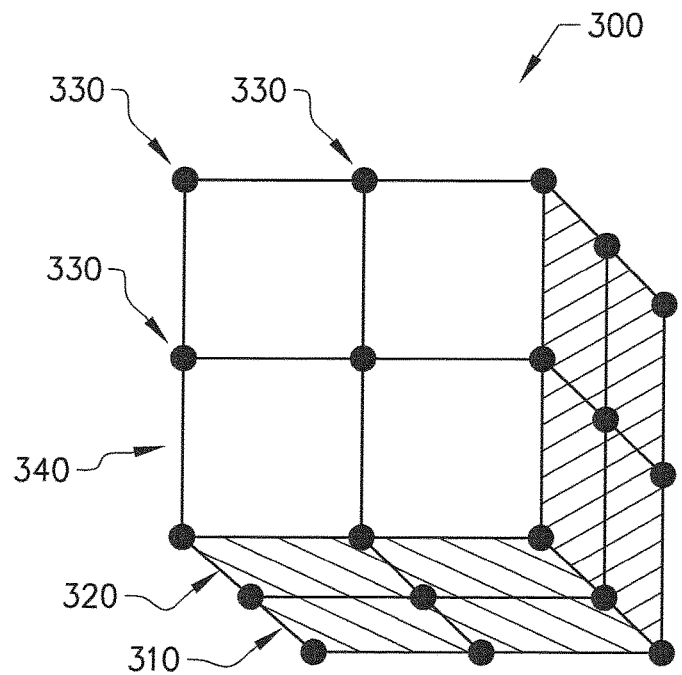
FIG. 3 depicts a regular 3-dimensional network.

In a first example embodiment said three-dimensional space is defined by providing a regular three-dimensional pattern of nodes. Said regular pattern of nodes may for instance be made of tetrahedrons, cubes or dodecahedrons, where the nodes are provided in corners and connected together in a predetermined way by struts to form regular three-dimensional structures. A distance between two nodes in the regular pattern of nodes is predetermined and can be chosen arbitrarily by an operator. FIG. 2*a* depicts a regular 2-dimensional square shaped network structure 100 comprising a 4×4 matrix of inner squares 110. FIG. 3 depicts a regular 3-dimensional cubic-shaped network structure 300 comprising two layers 310, 320 of 2×2 matrixes of cubes. A matrix comprises a predetermined number of nodes 330 connected together in a predetermined way with a predetermined number of struts 340.

The network structure in FIG. 3 may be used as a starting point in the inventive method according to the present invention, in which an improved 3-dimensional article with porosity is to be created which is less CPU and memory consuming compared to the prior art methods.

Figure 4:
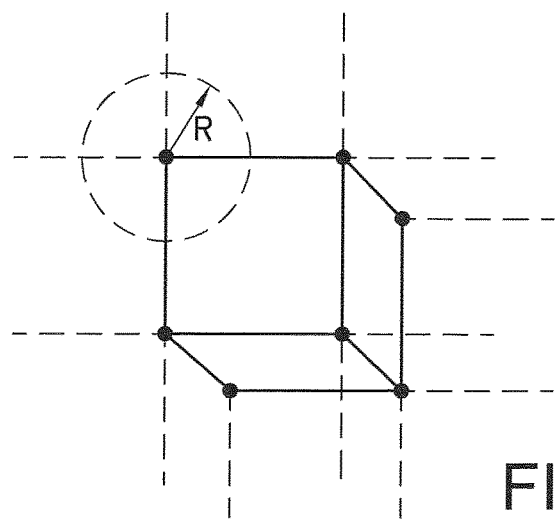
FIG. 4 depicts a single cube inside a regular 3-dimensional network and a displacement vector R.
Figure 5:
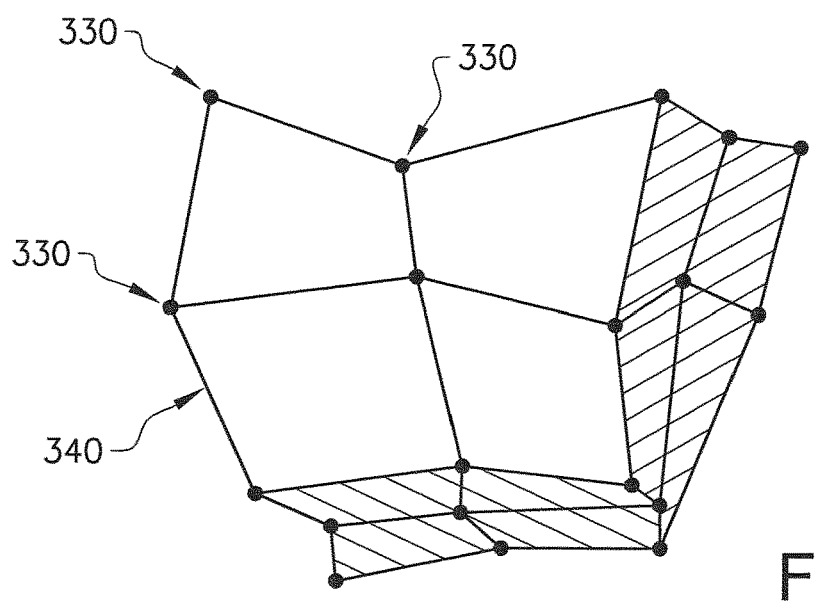
FIG. 5 depicts a randomized 3-dimensional network.

Each and every node 330 is thereafter moved a randomized distance, which distance is less than a predetermined value and in a randomized direction. This will destroy the regularity of the original structure. In FIG. 4 said randomized distance in said randomized direction is denoted by R, where R≤said predetermined value. The smaller said R is the smaller the destruction of said regularity of said structure will be. FIG. 2*b* depicts a 2-dimensional illustration of how the square original pattern may look like after moving each node said predetermined distance R in said randomized direction. FIG. 5 depicts a 3-dimensional illustration of how the cubic original pattern may look like after moving each node said predetermined distance R in said randomized direction. From said regular three dimensional structure has a completely randomized three-dimensional space been made without periodicity, which means that the randomization will look the same irrespective in which direction you will look into said three-dimensional randomized space. The hollowness, i.e., degree of empty space in said randomized space is determined by the number of nodes in said three-dimensional space, which in turn determine the number of tetrahedrons, cubes or dodecahedrons which will be stacked in said three-dimensional space. The randomization is determined by moving each node in said randomized direction but a predetermined distance R from its original position.

In a second example embodiment said three-dimensional space is defined by firstly providing a predetermined number of nodes randomly in a 3-dimensional space of a predetermined size.

Secondly a maximum number of neighbor nodes to a specific node is determined. This maximum number may be any positive integer between 1-∞.

Thirdly a number x of closest neighbors to said specific node is skipped. X may be a random positive integer number being ≥0. Being skipped should here be interpreted as ignoring those x nodes which is/are closest to a given node.

Fourthly, each of said maximum neighbor nodes, except those nodes that might have been skipped, are connected to said specific node with a strut. Step a-d is repeated for each node in the 3-dimensional space.

In a third example embodiment said three-dimensional space is defined by firstly providing a predetermined number of nodes randomly in a 3-dimensional space of a predetermined size.

Secondly said nodes are provided in a Delauney-triangulation giving a predetermined number of Delauney-tetrahedrons. In an example embodiment said tetrahedrons are provided with smallest angles connecting the nodes, i.e., the first derivative of two struts connected together via a node is continuous.

Thirdly a Voronoi diagram is provided by for each Delauny-tetrahedron connecting the centre of the circumsphere of the Delanuney-tetrahedron with the centres of the circumspheres for all the neighbors of the Delauney-tetrahedron. The method of constructing a randomized network according to this principle is well known in the art and could be studied in for instance "Randomized incremental construction of Delaunay and Voronoi diagrams" by Leonidas J. Guibas, Donald E. Knuth and Micha Sharir.

Figure 7A:
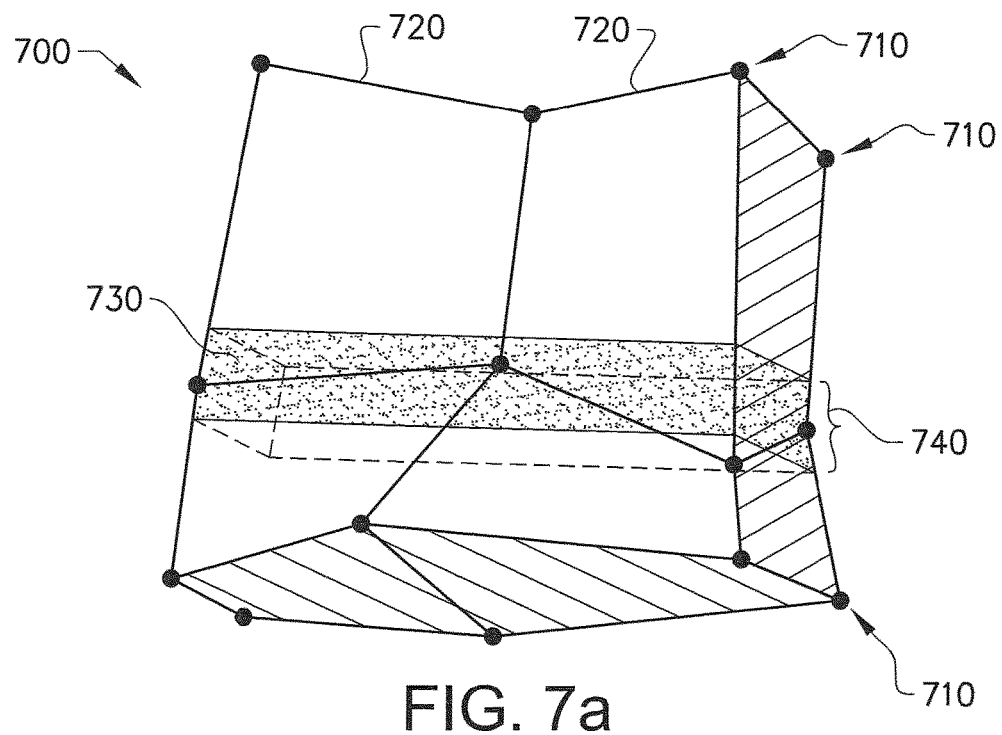
FIGS. 7a-7c depict a slice taken out of a random 3-dimensional structure.
Figure 7B:
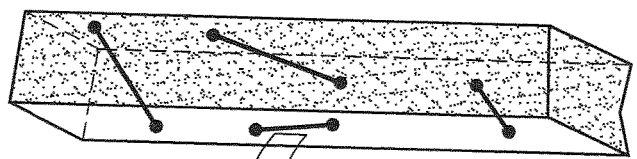
Figure 7C:
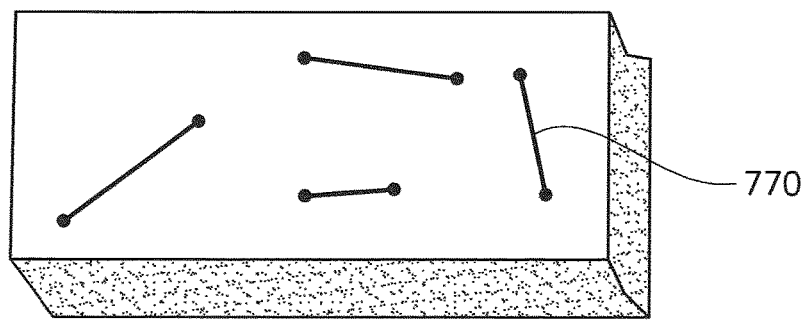

In a second step said three-dimensional space is sliced into a predetermined number of two-dimensional layers with a predetermined thickness. The two dimensional layers could be sliced at an arbitrarily plane in said three-dimensional space. The number of two-dimensional planes building up said three-dimensional space is depending on the thickness of said two dimensional planes, the smaller the thickness of said planes the larger the number of planes it takes to build the complete three-dimensional space. FIG. 7a-7c illustrates this operation. In FIG. 7a it is depicted a three-dimensional space 700 comprising a randomized pattern of nodes connected in a predetermined way by struts 720. A two-dimensional plane 730 is grey-shaded in FIG. 7a. Said two-dimensional plane has a predetermined thickness 740. In FIG. 7b said 2-dimensional plane 730 is illustrated separately from three-dimensional structure 700. In FIG. 7c it is illustrated a top view of the 2-dimensional plane which is illustrated from a side view in FIG. 7b. From FIGS. 7b and 7c it is illustrated an example 2-dimensional layer in which structures to be fused in the fusion process for forming the final 3-dimensional porous article.

Figure 6:
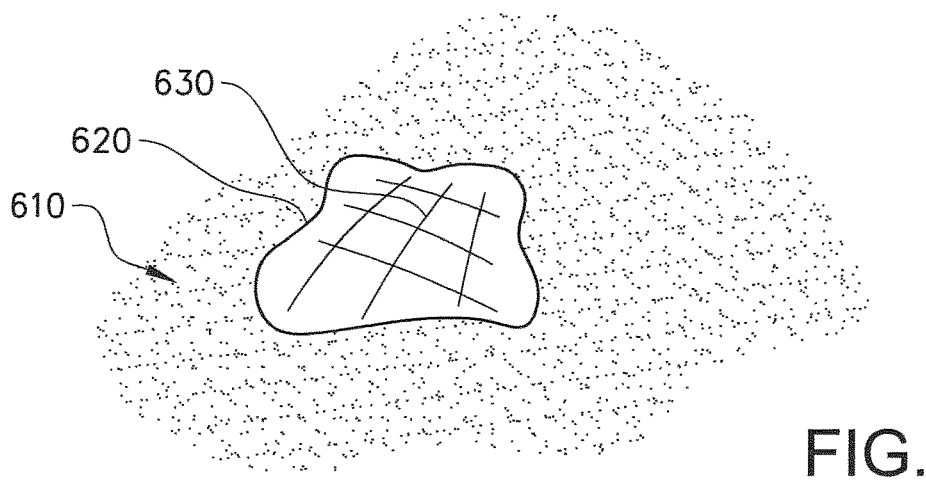
FIG. 6 depicts a Boolean operation of a 2-dimensional article structure on a 2-dimensional randomized network structure.

In a third step one two-dimensional layer of said model of non-porous three-dimensional article is applied on one two-dimensional layer of said porous structure resulting in a porous two-dimensional layer of said article. An example embodiment of this is illustrated in FIG. 6. The porous two-dimensional layer is denoted 610. The model of said non porous two-dimensional layer is denoted 620.

The meaning of applying one two-dimensional layer of said model of non-porous three-dimensional article on one two-dimensional layer of said porous structure resulting in a porous two-dimensional layer of said article is to use a Boolean operation resulting in deletion of the porous structure outside the model of said non porous two-dimensional layer 620 and a creation of a porous structure inside the model of said non porous two-dimensional layer 620, i.e., the two-dimensional layer of said model of non-porous three-dimensional article has become a porous two-dimensional layer of said three-dimensional article denoted by 630 in FIG. 6. The porous structure of said two-dimensional layer of said three-dimensional article is randomized. There is no repeatability of the randomized porous structure within the two-dimensional layer. Since a complete 3-dimensional space comprising a randomized pattern of nodes has been sliced into a predetermined number of two-dimensional layers with a predetermined thickness, there is no repeatability in the porous structure in said three-dimensional article to be produced. End points of lines may end on the outer surface of the three-dimensional article by using this method for creating a porous three-dimensional article, i.e., the porous structure of said final three-dimensional article may have an outer surface which corresponds very well with the outer surface of the model of said three-dimensional article.

In a fourth step said applying step is repeated for all two-dimensional layers of said article in order to create a complete porous 3-dimensional model of the article to be manufactured.

The porous three-dimensional article is manufactured by exposing fusible material to an energy source, so that a layer of fused material is corresponding to a porous two-dimensional layer of said article.

In another example embodiment a layer of powder material is provided on a build platform 2. The thickness of the powder material layer is adapted to the thickness of the predetermined thickness of the two-dimensional layer of said article. When deciding upon the thickness of the two-dimensional layers in said model, said thickness is corresponding to the thickness of the actual powder layer out of which said final three-dimensional article is to be made of.

Said powder material may be made of metal for instance titanium, titanium alloys, Co—Cr alloys, nickel based superalloys, aluminium, aluminium alloys, etc.

Said energy source may be an electron beam source, a laser source or a particle beam source.

A first derivative of at least one connection between two struts may be continuous. This is illustrated in a 2-dimensional case in FIG. 2c. This operation is optional and is used for smoothening the edges of the network structure to become more human-like.

In an example embodiment of the present invention an approximated Voronoi diagram may be used instead of the above mentioned Voronoi diagram.

In an example embodiment of the present invention a randomized pattern of point may be generated inside a volume of the porous three-dimensional object to be manufactured. This may be useful if the outer shape of the manufactured three-dimensional article need not to be identical with the model of said porous three-dimensional article. Since the randomized pattern is generated inside the volume of the three-dimensional object, it is highly likely that the outer surface in said actual manufactured article is lying inside the model of said porous three-dimensional article. The reason for this is that the very few of the randomized pattern of points may be provided exactly on the boarder of said three-dimensional article.

In an example embodiment the struts which may connect the points may be a volume element, an area element or a linear element. An area element may be flat and the linear element may be a one dimensional line.

In the fusion process such lines or points are melted as lines or points or as a 2-dimensional figure around the point or line, e.g., like small circles or ovals.

In an example embodiment a linear element may be inclined with an angle $\alpha$ with respect to a slicing surface, where $15° \leq \alpha \leq 165°$. In an example embodiment a linear element may be inclined with an angle $\alpha$ with respect to a slicing surface, where $10° \leq \alpha \leq 170°$. If a line which may connect two points lying in two different and adjacent layers is horizontal or almost horizontal, such a line may not connect said two points in said two layers after the slicing procedure and/or the manufacturing procedure.

In still another example embodiment a maximum and minimum value of said angle $\alpha$ may be dependent on the thickness of the slicing layer.

In an example embodiment of the present invention it is provided a method for manufacturing a porous three-dimensional article comprising the steps of: creating a model of a non-porous three-dimensional article comprising a predetermined number of two-dimensional layers with a predetermined thickness, creating a model of a porous structure comprising the steps of: defining a three-dimensional space, larger or equal to the non-porous three-dimensional space, comprising a randomized pattern of nodes, wherein said nodes are connected together in a predetermined manner with struts. Slicing said three-dimensional space into a predetermined number of two-dimensional layers with a predetermined thickness, and if necessary applying one two-dimensional layer of said model of non-porous three-dimensional article on one two-dimensional layer of said porous structure resulting in a porous two-dimensional layer of said article. Repeating said applying step for all non-porous two-dimensional layers of said article, manufacturing the porous three-dimensional article by exposing fusible material to an energy source, so that a layer of fused material is corresponding to a porous two-dimensional layer of said article.

In still another example embodiment of the present invention said struts may either be described by volume, area or line elements or by any combination of these elements.

In still another example embodiment of the present invention said porous two-dimensional layers of said article may be described by either the 2D polygon data created from slicing the volume elements or of 2D line data created from slicing the area elements or of 2D point data created from slicing line elements or by any combination of these three sets of data.

In yet another example embodiment of the present invention said 2D line data and 2D point data in the porous two-dimensional layers of said article may be expanded to a predetermined 2D polygon data located at a predetermined position relative to the 2D line data or to the 2D point data.

The invention is not limited to the above-described embodiments and many modifications are possible within the scope of the following claims. Such modifications may, for example, involve using a different source of ray gun than the exemplified electron beam such as laser beam. Other materials than metallic powder may be used such as powder of polymers or powder of ceramics.

The invention claimed is:

1. A method for manufacturing a porous three-dimensional article comprising the steps of:
   creating a model of a non-porous three-dimensional article comprising a predetermined number of layers with a predetermined thickness;
   creating a model of a porous structure, said creating step comprising the steps of:
      defining a completely randomized three-dimensional space comprising a randomized arrangement of nodes, said randomized arrangement of nodes defined by the steps of:
         a. identifying a predetermined number of said nodes initially arranged randomly in the three-dimensional space of predetermined size;
         b. determining a maximum number of neighbor nodes to a specific node;
         c. skipping a number x of closest neighbors to said specific node where x is a random integer number being $\geq 0$;
         d. connecting each of said maximum neighbor nodes, with the exception of the skipped nodes, to said specific node with a strut; and
         e. repeating steps a-d for each node in the three-dimensional space,
      wherein said nodes are connected together in the randomized arrangement using struts, wherein said randomized arrangement is randomized in every direction of the completely randomized three-dimensional space, and wherein said randomized arrangement lacks periodicity, such that due to the lacking periodicity, a mechanical strength of a porous structure created therefrom is equal in all directions;
   slicing said completely randomized three-dimensional space into a predetermined number of layers with a predetermined thickness;
   applying one layer of said model of the non-porous three-dimensional article on one layer of said randomized three-dimensional space resulting in a model of a porous layer of said porous three-dimensional article; and
   repeating said applying step for all layers of said model of the non-porous three-dimensional article; and
   manufacturing the porous three-dimensional article by exposing fusible material to an energy source, so that a layer of fused material is corresponding to the model of the porous layer of said porous three-dimensional article,
   wherein said porous three-dimensional article lacks periodicity.

2. The method according to claim 1, wherein the manufacturing step comprises the steps of:
   providing a layer of powder material on a build platform; and
   adapting a thickness of the provided powder material layer to the predetermined thickness of the layer of the porous three-dimensional article.

3. The method according to claim 2, wherein said powder material is made of metal.

4. The method according to claim 1, wherein said energy source is an electron beam source.

5. The method according to claim 1, wherein the randomized arrangement comprises at least a first strut passing through a node and having a continuous derivative to at least a second strut passing through said node.

6. The method according to claim 1, wherein the energy source comprise a laser.

7. The method according to claim 1, wherein the step of creating the model of the porous structure is subsequent to the step of creating the model of the non-porous three-dimensional article.

\* \* \* \* \*